(12) United States Patent
Usui et al.

(10) Patent No.: US 6,345,174 B1
(45) Date of Patent: Feb. 5, 2002

(54) DISPLAY APPARATUS FOR A VEHICLE AUDIO SYSTEM

(75) Inventors: Naoki Usui; Kazuo Hozumi; Jyun Shirahama, all of Yokohama (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/172,302

(22) Filed: Oct. 14, 1998

(30) Foreign Application Priority Data

Feb. 25, 1998 (JP) .......................................... 10-044056

(51) Int. Cl.[7] ................................................. H04B 1/18
(52) U.S. Cl. ................. 455/154.1; 455/566; 455/158.1; 455/158.5; 381/86; 345/33; 345/34; 345/53
(58) Field of Search ........................ 455/45, 86.1, 566, 455/150.1, 154.1, 155.1, 158.1, 158.2, 158.4, 158.5; 381/86, 103; 345/40, 33, 34, 53

(56) References Cited

U.S. PATENT DOCUMENTS

| | | | | |
|---|---|---|---|---|
| 5,381,178 A | * | 1/1995 | Miyamoto et al. | 348/333 |
| 5,475,516 A | * | 12/1995 | Yoshizawa et al. | 359/54 |
| 5,530,924 A | * | 6/1996 | Miller | 455/186.1 |
| 5,537,614 A | * | 7/1996 | Hagimori et al. | 381/103 |
| 5,701,588 A | * | 12/1997 | Morita et al. | 455/38.4 |

FOREIGN PATENT DOCUMENTS

| | | |
|---|---|---|
| JP | 61-267097 | 11/1986 |
| JP | 3-216883 | 9/1991 |
| JP | 6-2340 | 1/1994 |

* cited by examiner

Primary Examiner—Dwayne Bost
Assistant Examiner—Lewis West
(74) Attorney, Agent, or Firm—Connolly Bove Lodge and Hutz LLP

(57) ABSTRACT

A display panel includes a plurality of alphanumeric segment display elements. A display control circuit controls a plurality of the alphanumeric segment display elements in accordance with either of frequency data or equalizing characteristic data supplied from an audio apparatus mounded on the vehicle. The display control circuit operates a plurality of the alphanumeric segment display elements either to display digits of the frequency data in response to the frequency data or to display a spectrum characteristic waveform over a plurality of the alphanumeric segment display elements in response to the equalizing characteristic data, so that equalizer characteristic is selectively displayed on the alphanumeric segment display elements originally provided for displaying the receiving frequency.

20 Claims, 6 Drawing Sheets

DISPLAY APPARATUS FOR A VEHICLE AUDIO SYSTEM

BACKGROUND OF THE INVENTION

1. Field of the Invention

This invention relates to a display apparatus for a vehicle audio system.

2. Description of the Prior Art

FIG. 5A is a front view of an LED display panel of a prior art audio apparatus and FIG. 5B is a side view of the prior art audio apparatus shown in FIG. 5A. In FIG. 5A, the LED display 1 displays a channel, a receiving band, a receiving frequency, and functions such as repeating with LED segment display elements. Under the LED display panel 1, another LED display panel 2 is arranged which displays a kind of music such as jazz, rock, or pop and an equalizing characteristic using straight and curved bars.

FIG. 6A is a front view of an LED display panel of another prior art audio apparatus and FIG. 6B is a side view of another prior art audio apparatus shown in FIG. 6A. In FIG. 6A, an LED display panel 3 of another prior art audio apparatus has a radio frequency display region 3a and an equalizer display region 3b on a single display board 3.

The LED display panel shown in FIG. 5A requires two display panels 1 and 2 and the displaying area is large. On the other hand, the LED display panel shown in FIG. 6A has wide display panel 3.

SUMMARY OF THE INVENTION

The aim of the present invention is to provide a superior display apparatus for a vehicle audio system.

According to the present invention there is provided a display apparatus for a vehicle including: a display panel including a plurality of alphanumeric segment display elements; and a display control circuit for controlling a plurality of said alphanumeric segment display elements in accordance with either of frequency data from an audio unit mounted on said vehicle to display digits of said frequency data or equalizing characteristic data supplied from said audio unit to display a spectrum distribution over a plurality of said alphanumeric segment display elements.

In the display apparatus, the display panel may include at least first to third of the alphanumeric segment display elements and the display control circuit operates the first alphanumeric segment display element to display a low frequency range level of the spectrum distribution, the second alphanumeric segment display element to display an intermediate frequency range level of the spectrum distribution, and the third alphanumeric segment display element to display a high frequency range level of the spectrum distribution.

In the display apparatus, the display panel may further include a kind display unit adjacent to a plurality of the alphanumeric segment display elements, the equalizing characteristic data further representing a kind of a music to be reproduced by the audio unit, and the display control circuit operates the kind display unit to display the kind in accordance with the equalizing characteristic data.

In the display apparatus, the display panel may further include a function display unit and the display control circuit operates the function display unit to display a function to be executed by the audio unit in accordance with function data from the audio unit.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
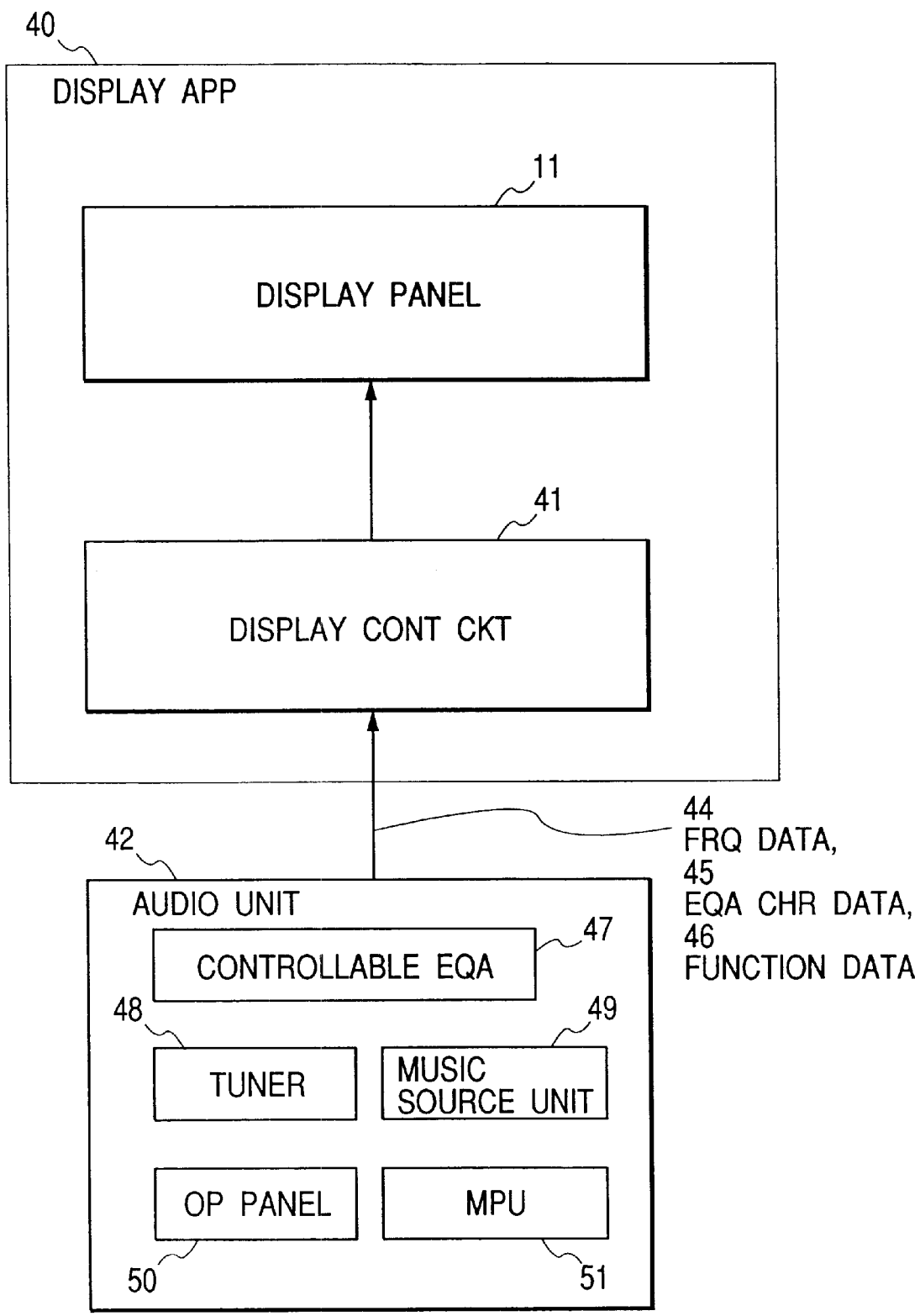
FIG. 1 is a block diagram of a display apparatus for a vehicle of the embodiment of this invention, wherein an audio unit used with the display apparatus is also shown.

FIG. 1 is a block diagram of a display apparatus for a vehicle of the embodiment of this invention, wherein an audio unit used with the display apparatus is also shown.

The display apparatus 40 for a vehicle of this embodiment includes a display panel 11 and a display control circuit 41. The display apparatus 40 is mounted on a vehicle together with an audio unit 42. The audio unit 42 includes a controllable equalizer 47, a tuner 48, a music source 49 selectively including a cassette tape player (not shown), a compact disc player (not shown), a mini-disc player (not shown), or the like, an operation panel 50, and a microprocessor 51. The microprocessor 51 in response to an operation to the operation panel 50 selects one of sources, that is, the tuner 48, the cassette tape player, the compact disc player, or the mini-disc player. The microprocessor 50 further responds to the operation panel 50 for tuning, selecting one of predetermined equalizing characteristics, operating one of predetermined functions of the tuner 48 and the music source unit 49. The microprocessor 50 generates and sends frequency data 44 when the tuner 48 is operated, equalizing characteristic data 45, and the function data 46 indicating one of the predetermined functions selected by the user (driver), at least.

Figure 2A:
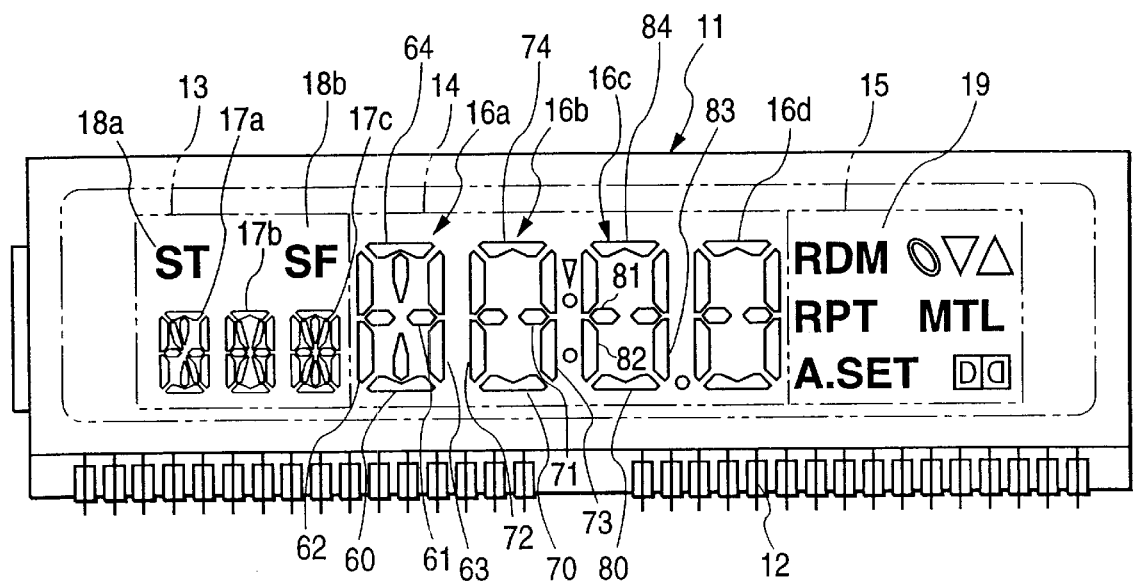
FIG. 2A is a front view of the display panel shown in FIG. 1.
Figure 2B:
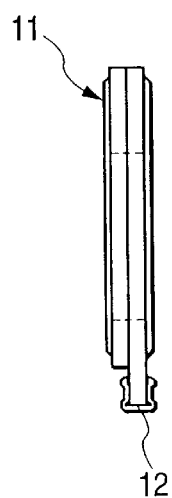
FIG. 2B is a side view of the display panel shown in FIG. 2A.

FIG. 2A is a front view of the display panel 11 shown in FIG. 1 and FIG. 2B is a side view of the display panel 11.

The display panel 11 of this embodiment includes a plurality of alphanumeric segment display elements 16a to 16d. The display control circuit 41 controls a plurality of the alphanumeric segment display elements 16a to 16d in accordance with either of the frequency data 44 or the equalizing characteristic data 45 supplied from the audio unit 42. The display control circuit 41 operates a plurality of the alphanumeric segment display elements 16a to 16d either to display digits of the frequency data 44 in response to the frequency data 44 in a receiving frequency displaying mode or to display a spectrum characteristic distribution (waveform) over the alphanumeric segment display elements 16a to 16c in response to the equalizing characteristic data 45 in an equalizing characteristic displaying mode.

In the receiving frequency displaying mode, the display control circuit 41 operates the alphanumeric segment display elements 16a to 16d to display the frequency data 44.

The display panel 11 includes at least first to third alphanumeric segment display elements 16a to 16c, and more specifically, first to fourth alphanumeric segment display elements 16a to 16d are included. In the equalizing characteristic displaying mode, the display control circuit 41 operates the first alphanumeric segment display element 16a to display a low frequency range (bass tone) level of the spectrum distribution, the second alphanumeric segment display element 16b to display an intermediate frequency (middle tone) range level of the spectrum distribution, and the third alphanumeric segment display element 16c to display a high frequency range (high tone) level of the spectrum distribution. However, it is also possible to display the spectrum distribution with second to fourth alphanumeric segment display elements 16b to 16d.

The display panel 11 further includes a kind display unit 13 adjacent to a plurality of the alphanumeric segment display elements 16a to 16d. The equalizing characteristic data 45 also represents a kind (type) of a music to be reproduced by the audio unit 42, that is, the equalizing characteristic data 45 also represents a kind of the music to be reproduced or being reproduced. More specifically, the display of the kind of the music to be reproduced corresponds to the display of the equalizing characteristic. The display control circuit 41 operates the kind display unit 13 to display the kind of the music or the like in response to the equalizing characteristic data 45.

The display panel 11 further includes a function display region 15 and the display control circuit 41 operates the function display region 15 to display a function to be executed by the audio unit 42 in response to function data 46 from the audio unit 42.

More specifically, the display panel 11 has three regions, that is, the kind display region 13 including three digits of alphanumeric segment display elements 17a to 17c indicating a receiving frequency band and character display elements 18a and 18b for indicating a receiving signal condition or a kind of the music under reproduction by the music source unit 49, a condition display region 14 including four digits of alphanumeric segment display elements 16a to 16c, each having a larger size than the alphanumeric segment display elements 17a to 17c for displaying either a receiving frequency or an equalizing frequency characteristic, and a function display region 15 including character (mark) display elements 19 for displaying at least one function such as repeating. All display elements such as the alphanumeric segments 17a to 17c, 16a to 16c, character elements 18a and 18b, and 19 use light emitting diodes. However, it is also possible to use liquid crystal display or the like for the display elements mentioned above. For each of the segment display elements 16a to 16d and 17a to 17c, either of a seven-segment chip, an eight-segment chip, a ten-segment chip, or a fourteen-segment chip is suitably selected.

FIGS. 3A to 3D are illustrations of this embodiment showing display conditions of the display panel 11 in the receiving frequency displaying mode.

Figure 3A:
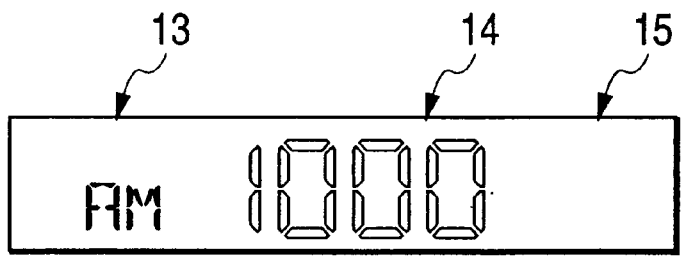
FIGS. 3A to 3D are illustrations of this embodiment showing display conditions of the display panel in the receiving frequency displaying mode.
Figure 3B:
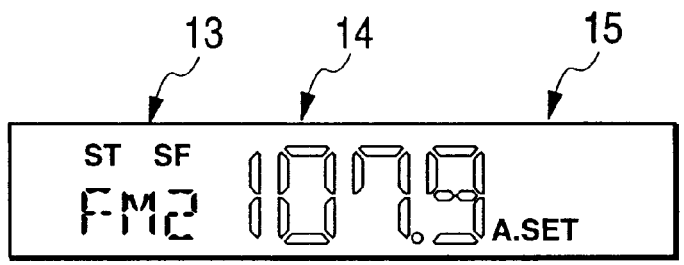
Figure 3C:
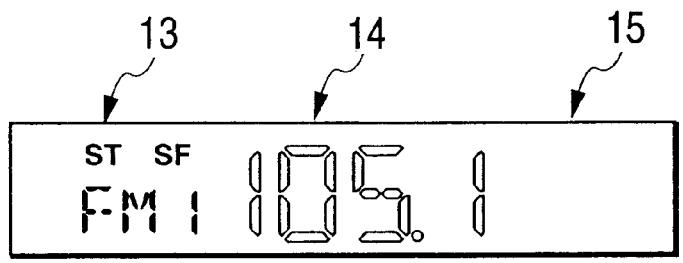
Figure 3D:
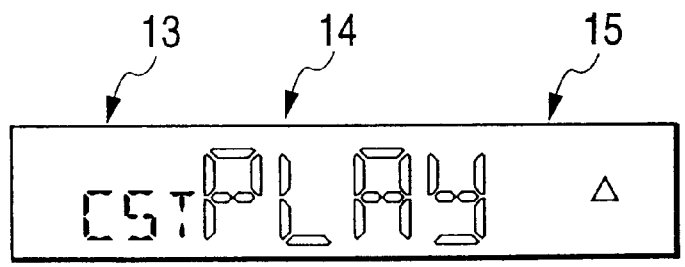

In FIG. 3A, "AM", which is one of frequency bands to be received, is displayed on the kind display region 13 and the receiving frequency "1000" is displayed on the condition display region 14. In FIG. 3B, "FM2", which is one of frequency bands to be received, is displayed on the kind display region 13, the receiving frequency "107.9" is displayed on the condition display region 14, and character display "A. SET" is displayed on the function display region 15. In FIG. 3C, "FM1", which is one of frequency bands to be received and character display elements 18a and 18b, that is, "ST" and "SF" are displayed on the kind display region 13, and the receiving frequency "105.1" is displayed on the condition display region 14. In FIG. 3D, "CST", which means activating the cassette player in the music source unit 49, is displayed on the kind display region 13, and "PLAY", which means reproduction of the cassette player, is displayed on the condition display region 14, and a tape traveling direction " " is displayed on the function display region 15.

FIGS. 4A to 4H are illustrations of this embodiment showing display conditions of the display panel 11 in an equalizing characteristic displaying mode.

Figure 4A:
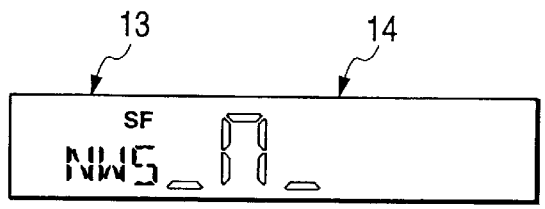
FIGS. 4A to 4H are illustrations of this embodiment showing display conditions of the display panel in an equalizing characteristic displaying mode.

In FIG. 4A, "NWS" indicating a news program and character display 18b, that is, "SF" is displayed on the kind displaying region 13. "SF" is an abridgement of "Sound Flavor" which means that the controllable equalizer has been set in advance. On the condition display region 14, at the first digit, only the base segment 60 of the segment display element 16a is turned on, at the second digit only the upper segment 74, and the left side of segment 72 and the right side segment 73 of the segment display element 16b are turned on, and at the third digit, only the base segment 80 of the segment display element 16c is turned on. That is, all segment display elements 16a to 16c represent a middle tone range enhanced spectrum characteristic (distribution).

As mentioned, in the equalizing characteristic displaying mode, three digits out of four digits of segment display elements 16a to 16d are used, wherein the first digit represents the bass tone characteristic (level), the second digit represents the middle tone characteristic (level), and the third digit represents a high tone characteristic (level). That is, the center horizontal lines 61, 71, and 81 of the segment display elements 16a to 16c represent normal equalizer characteristic, i.e., the gain of the range is one, and the base segments 60, 70, and 80 of the segment display elements 16a to 16c represent suppressing a loudness, i.e., the gain of the range is less than one, and the upper lines 64, 74, and 84 of the segment display elements 16a to 16c represent enhancement of a loudness in the range, i.e., the gain of the range is more than one.

Figure 4B:
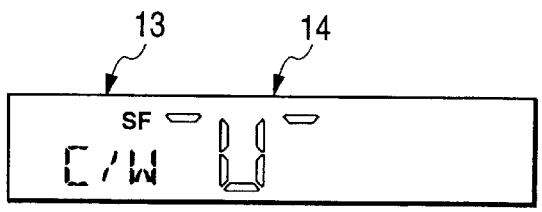

Similarly, in FIG. 4B, on the kind display region 13, "C/W", which means country-and-western, and character display element "SF" are displayed. On the condition display region 14, at the first digit, only the upper segment 64 of the segment display element 16a is turned on, at the second digit, only the base segment 70 and both side segments 72 and 73 of the segment display element 16b are turned on, and at the third digit, only the upper segment 84 of the segment display element 16c is turned on. That is, all segment display elements 16a to 16c represent a spectrum characteristic of which bass and high tone ranges are enhanced, and the middle tone range is suppressed.

Figure 4C:
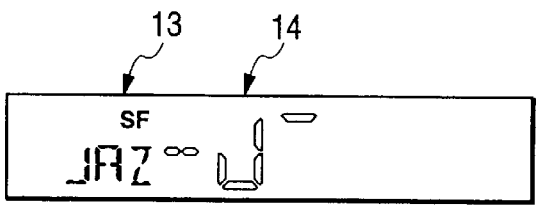

In FIG. 4C, on the kind display region 13, "JAZ", which means jazz music, and character display element "SF" are displayed. On the condition display region 14, at the first digit, only the middle segment 61 of the segment display element 16a is turned on, at the second digit only the base segment 70 and lower of the left side segment 72 and the right side segment 73 of the segment display element 16b are turned on, and at the third digit, only the upper segment 84 of the segment display element 16c is turned on. That is, all segment display elements 16a to 16c represent a spectrum characteristic (distribution) of which bass tone is reproduced at a gain of one, the middle tone range is suppressed, and the high tone range is enhanced.

Figure 4D:
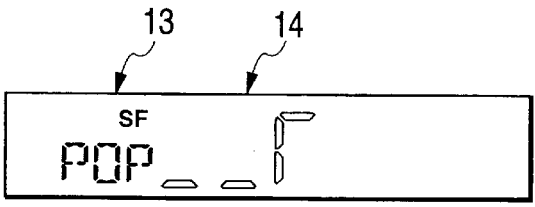

In FIG. 4D, on the kind display region 13, "POP", which means pop music, and the character display element "SF" are displayed. On the condition display region 14, at the first digit, only the base segment 60 of the segment display element 16a is turned on, at the second digit, only the base segment 70 of the segment display element 16b is turned on, and at the third digit, the left side segment 82 and the upper segment 84 of the segment display element 16c are turned on. That is, all segment display elements 16a to 16c represent a spectrum characteristic of which a high tone range is enhanced, and the bass and middle tone ranges are suppressed.

Figure 4E:
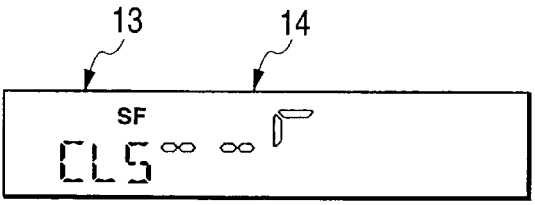

In FIG. 4E, on the kind display region 13, "CLS", which means classical music, and the character display element "SF" are displayed. On the condition display region 14, at the first digit, only the middle segment 61 of the segment display element 16a is turned on, at the second digit, only the middle segment 71 of the segment display element 16b is turned on, and at the third digit, the upper portion of the left side segment 83 and the upper segment 84 of the segment display element 16c are turned on. That is, all segment display elements 16a to 16c represent a spectrum characteristic of which bass and middle tone ranges are reproduced at a gain of one, and the high tone range is enhanced.

Figure 4F:
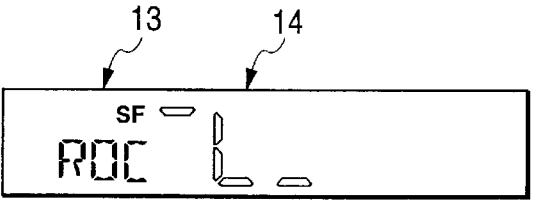

In FIG. 4F, on the kind display region 13, "ROC", which means rock music, and the character display element "SF" are displayed. On the condition display region 14, at the first digit, only the upper segment 64 of the segment display element 16a is turned on, at the second digit, only the base segment 70 and the left side segment 72 of the segment display element 16b, and at the third digit, only the base segment 80 of the segment display element 16c is turned on. That is, all segment display elements 16a to 16c represent a spectrum characteristic of which a bass tone range is enhanced, and the middle tone and high tone ranges are suppressed.

Figure 4G:
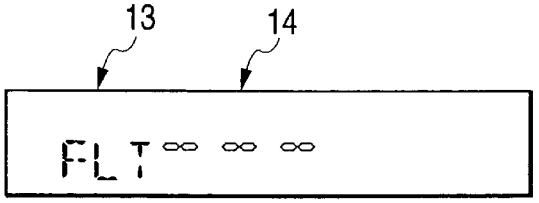

In FIG. 4G, on the kind display region 13, "FLT", which means a flat characteristic, is displayed. On the condition display region 14, at the first digit to third digit, only the middle segments 61, 71, and 81 are turned on. That is, the bass, middle, and high tone ranges are reproduced at the equalizing gain of one.

Figure 4H:
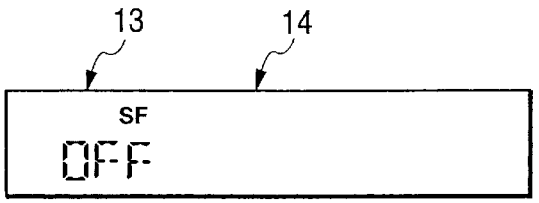
Figure 5A:
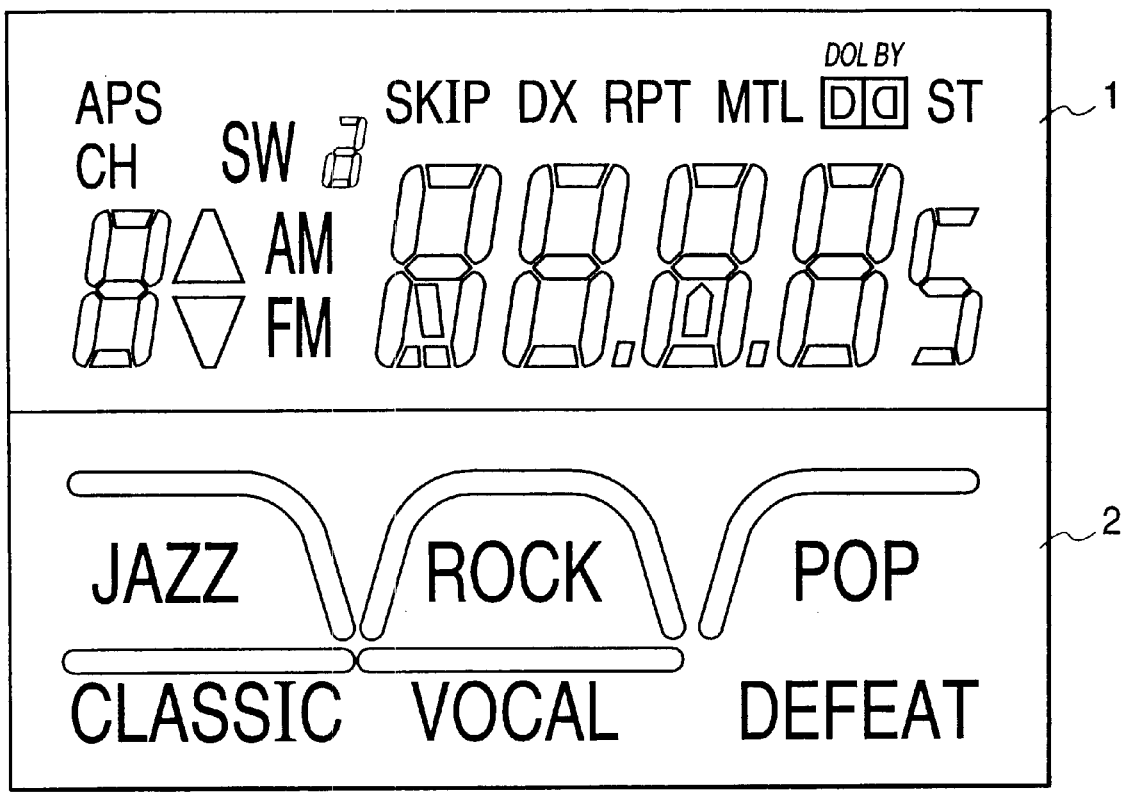
FIG. 5A is a front view of an LED display panel of a prior art audio apparatus.
Figure 5B:
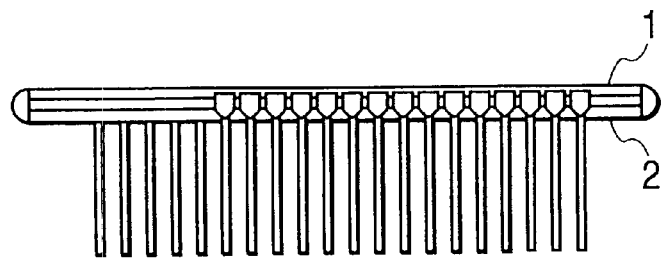
FIG. 5B is a side view of the prior art audio apparatus shown in FIG. 5A.
Figure 6A:
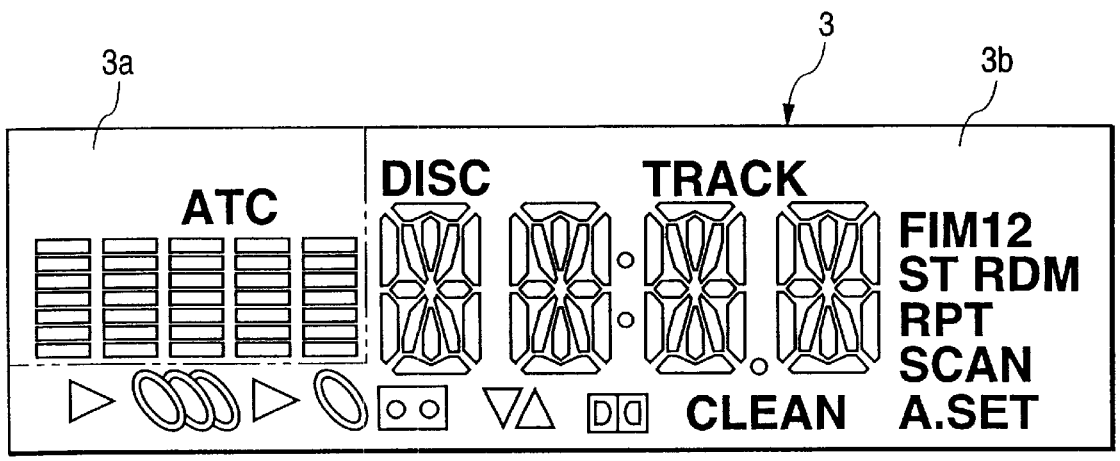
FIG. 6A is a front view of an LED display panel of another prior art audio apparatus.
Figure 6B:
FIG. 6B is a side view of another prior art audio apparatus shown in FIG. 6A.

In FIG. 4H, on the kind display region 13, "OFF" is displayed to indicate stopping reproduction.

In FIG. 4G, on the kind display region 13, "FLT" which means a flat characteristic is displayed. On the condition display region 14, at the first digit to third digit, only the middle segments 63, 73, and 83 are turned on. That is, the base, middle, and high tone ranges are reproduced at the equalizing gain of one.

In FIG. 4H, on the kind display region 13, "OFF" is displayed to indicate stopping reproducing.

The audio unit 42 receives an operation for selecting one of predetermined equalizer characteristics by a user (driver) by selecting a kind of the music or the program to be reproduced or under reproducing. In response to the operation the microprocessor 51 of the audio unit 42 selects one of predetermined equalizer characteristics in accordance with the selecting operation and sends the equalizing characteristic data 45 to the display control circuit 41.

The alphanumeric segment display elements 16a to 16d, 17a to 17c, character display elements 18a, 18b, and 19 in the display panel 11 are provided with LCD (Liquid Crystal display) elements. However, LED display elements and fluorescent display elements are also applicable.

What is claimed is:

1. A display apparatus for a vehicle, comprising:
   a display panel including a plurality of alphanumeric segment display elements; and
   display control means for controlling a plurality of said alphanumeric segment display elements in accordance with frequency data from an audio unit mounted on said vehicle to display digits of said frequency data and equalizing characteristic data supplied from said audio unit to display a spectrum distribution over a plurality of said alphanumeric segment display elements,
   wherein each of said alphanumeric segment display elements represents one level of each band in said spectrum distribution.

2. A display apparatus as claimed in claim 1, wherein said display panel includes at least first to third of said alphanumeric segment display elements and said display control means operates said first alphanumeric segment display element to display a low frequency range level of said spectrum distribution, said second alphanumeric segment display element to display an intermediate frequency range level of said spectrum distribution, and said third alphanumeric segment display element to display a high frequency range level of said spectrum distribution.

3. A display apparatus as claimed in claim 1, wherein said display panel further includes a kind display means adjacent to a plurality of said alphanumeric segment display elements, said equalizing characteristic data further representing a kind of a music to be reproduced by said audio unit and said display control means operates said kind display means to display a kind corresponding to said equalizing characteristic data.

4. A display apparatus as claimed in claim 1, wherein said display panel further includes function display means and said display control means operates said function display means to display a function to be executed by said audio unit in accordance with function data from said audio unit.

5. A display apparatus as claimed in claim 1, wherein said display panel includes a plurality of said alphanumeric segment display elements, each having horizontal bar elements and side bar elements and said display control means operates said alphanumeric segment display elements such that each of alphanumeric segments displays a level at each of frequency bands and each of said side elements is used between displaying consecutive frequency bands to display said spectrum distribution.

6. A display apparatus as claimed in claim 2, wherein said display panel further includes a kind display means adjacent to a plurality of said alphanumeric segment display elements, said equalizing characteristic data further representing a kind of music to be reproduced by said audio unit and said display control means operates said kind display means to display said kind of music in accordance with said equalizing characteristic data.

7. A display apparatus as claimed in claim 2, wherein said display panel further includes function display means and said display control means operates said function display means to display a function to be executed by said audio unit in accordance with function data from said audio unit.

8. A display apparatus as claimed in claim 5, wherein said display panel further includes a kind display means adjacent to a plurality of said alphanumeric segment display elements, said equalizing characteristic data further representing a kind of music to be reproduced by said audio unit and said display control means operates said kind display means to display said kind of music in accordance with said equalizing characteristic data.

9. A display apparatus as claimed in claim 5, wherein said display panel further includes function display means and said display control means operates said function display means to display a function to be executed by said audio unit in accordance with function data from said audio unit.

10. A display apparatus as claimed in claim 1, wherein each of said plurality of alphanumeric segment display elements represents one level from only one of a high, a middle, and a low band in said spectrum distribution.

11. The display apparatus of claim 1, wherein said spectrum distribution is displayed when said display panel is in an equalizing characteristic displaying mode.

12. The display apparatus of claim 1, wherein said digits of said frequency data are displayed only when said display panel is in a receiving frequency displaying mode.

13. A display apparatus for a vehicle, comprising:
a display panel including a plurality of alphanumeric segment display elements; and
display control means for controlling the plurality of said alphanumeric segment display elements in accordance with frequency data from an audio unit mounted on said vehicle to display digits of said frequency data and equalizing characteristic data supplied from said audio unit to display a spectrum distribution over a plurality of said alphanumeric segment display elements,
said display panel including first, second, and third of said alphanumeric segment display elements,
said display control means controlling each of said first, second, and third alphanumeric segment display elements to display a low frequency range level, an intermediate frequency range level, and a high frequency range level of said spectrum distribution, respectively,
wherein said spectrum distribution is represented by said first to third alphanumeric segment display elements.

14. The display apparatus of claim 13, wherein said spectrum distribution is displayed when said display panel is in an equalizing characteristic displaying mode.

15. The display apparatus of claim 13, wherein said digits of said frequency data are displayed when said display panel is in a receiving frequency displaying mode.

16. A display apparatus for a vehicle, comprising:
a display panel including a plurality of alphanumeric segment display elements;
an audio unit mounted on said vehicle; and
a display control circuit for controlling the plurality of said alphanumeric segment display elements in accordance with equalizing characteristic data supplied by said audio unit,
said display panel displaying a spectrum distribution over at least a portion of the plurality of said alphanumeric segment display elements.

17. The display apparatus of claim 16, wherein said at least a portion of the plurality of said alphanumeric segment display elements includes first to third alphanumeric segment display elements which are used to represent the spectrum distribution.

18. The display apparatus of claim 16, wherein said display panel includes first, second, and third of said alphanumeric segment display elements,
said display control circuit controlling each of said first, second, and third alphanumeric segment display elements to display a low frequency range level, an intermediate frequency range level, and a high frequency range level of said spectrum distribution, respectively.

19. The display apparatus of claim 16, wherein frequency data supplied by said audio unit is used by said display control circuit to display a plurality of digits of said frequency data on said display when said display panel is in a receiving frequency displaying mode.

20. The display apparatus of claim 16, wherein said display panel displays the spectrum distribution over the plurality of said alphanumeric segment display elements only when said display panel is in an equalizing characteristic displaying mode, and
frequency data supplied by said audio unit is used to display a plurality of digits of said frequency data on said display only when said display panel is in a receiving frequency displaying mode.

* * * * *